(12) United States Patent
Bruford et al.

(10) Patent No.: US 7,118,150 B2
(45) Date of Patent: Oct. 10, 2006

(54) STORAGE COMPARTMENT AND STEP FOR PICK-UP TRUCKS

(75) Inventors: Stephen Bruford, West Bloomfield, MI (US); Paul Elia, West Bloomfield, MI (US); John Reed, Royal Oak, MI (US); Tyler Blake, Rancho Santa Margarita, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 10/975,065

(22) Filed: Oct. 27, 2004

(65) Prior Publication Data

US 2006/0087141 A1    Apr. 27, 2006

(51) Int. Cl.
    *B60R 9/02* (2006.01)
(52) U.S. Cl. ..................................... 296/37.1
(58) Field of Classification Search ............... 296/37.1, 296/37.6, 24.3, 146.11, 75, 151
    See application file for complete search history.

(56) References Cited

U.S. PATENT DOCUMENTS

| | | | |
|---|---|---|---|
| 1,726,398 A | 8/1929 | Limbocker | ................. 296/37.1 |
| 4,917,430 A | 4/1990 | Lawrence | |
| 4,930,836 A | 6/1990 | Grinn | |
| 5,267,773 A | 12/1993 | Kalis, Jr. et al. | |
| 5,615,922 A * | 4/1997 | Blanchard | .................. 296/37.6 |
| 6,030,018 A | 2/2000 | Clare | ........................ 296/37.6 |
| 6,053,561 A | 4/2000 | Hojnowski et al. | |
| 6,059,341 A * | 5/2000 | Jensen et al. | ............... 296/37.6 |
| 6,059,352 A | 5/2000 | Heldt et al. | |
| 6,129,401 A * | 10/2000 | Neag et al. | ................. 296/37.6 |
| 6,340,191 B1* | 1/2002 | Brady | ........................ 296/37.6 |
| 6,460,915 B1* | 10/2002 | Bedi et al. | ................ 296/183.1 |
| 6,478,355 B1 | 11/2002 | Van Eden et al. | |
| 6,533,303 B1 | 3/2003 | Watson | ........................ 280/166 |
| 6,705,666 B1* | 3/2004 | Lynch et al. | ................. 296/164 |
| 6,966,593 B1* | 11/2005 | Plentis et al. | ............... 296/37.6 |
| 2001/0024023 A1 | 9/2001 | Farkash | |

FOREIGN PATENT DOCUMENTS

JP    406270848    *  9/1994    ................... 296/32

* cited by examiner

*Primary Examiner*—H Gutman
(74) *Attorney, Agent, or Firm*—Gigette M. Bejin; Miller Lawgroup, PLLC

(57) ABSTRACT

A storage compartment is formed on the lateral side of a pick-up truck to have a door that will open to a generally horizontal position to permit use thereof as a step to facilitate access to the interior of the cargo bed. The storage compartment door is pivotally supported by a pivot mechanism that is supported from the underside of the pick up box to provide sufficient support thereof to withstand the weight of a person utilizing the door as a step. The door is also provided with supplemental support members interconnecting the door and the underside of the pick up box. When closed, the door conceals the pivot mechanism to provide a smooth, clean line on the exterior surface of the truck. The opened door allows access to a storage compartment that preferably extends beneath a portion of the cargo bed to allow storage of small items in a contained compartment.

13 Claims, 3 Drawing Sheets

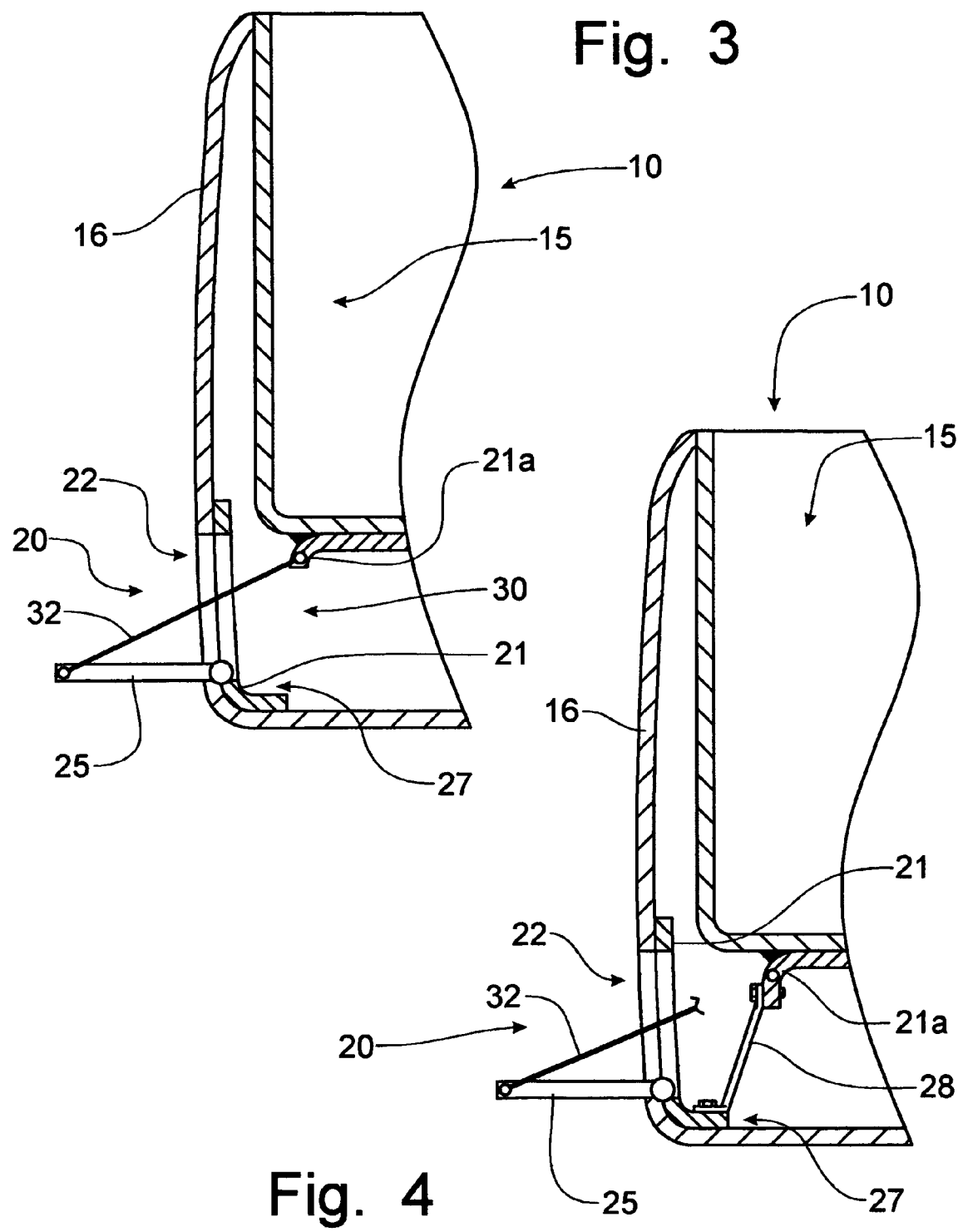

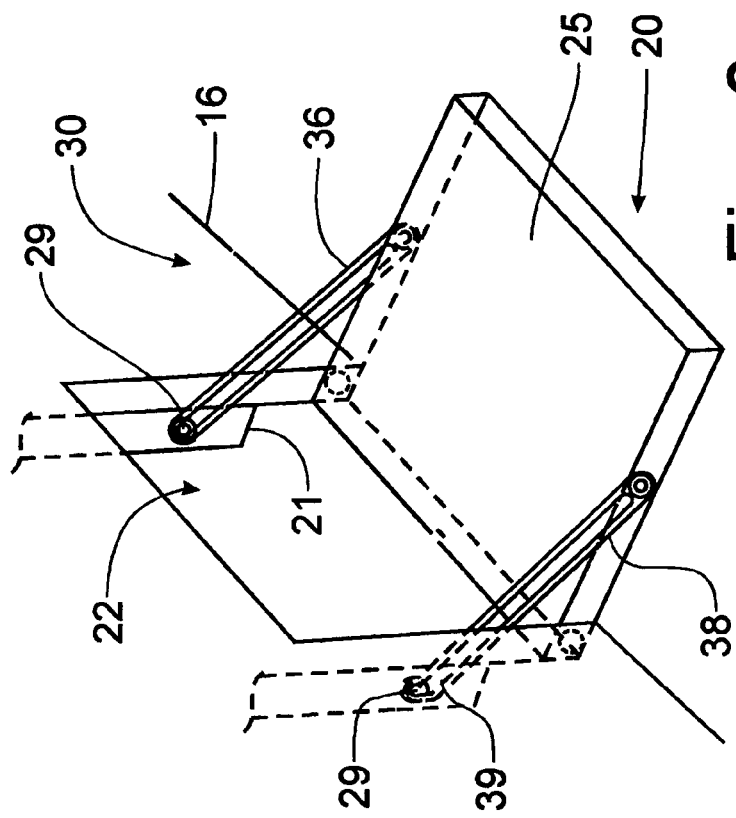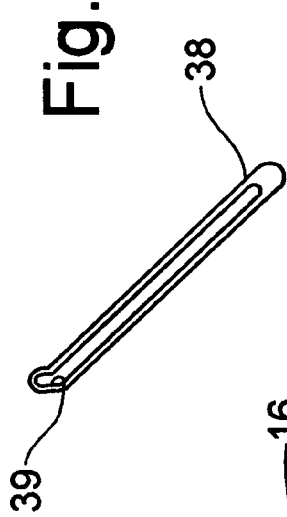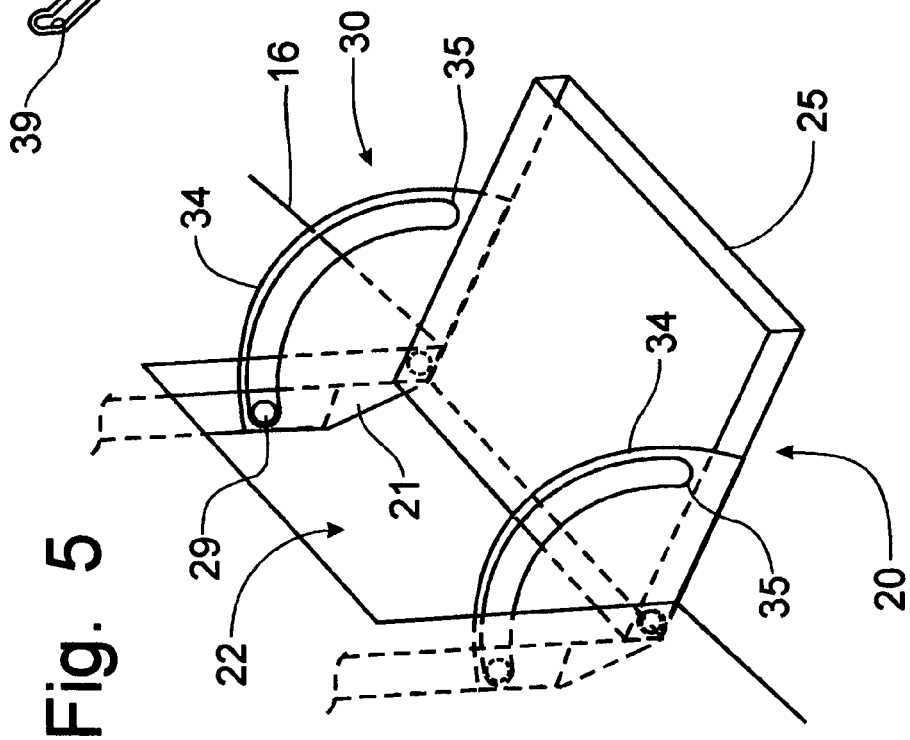

STORAGE COMPARTMENT AND STEP FOR PICK-UP TRUCKS

FIELD OF THE INVENTION

The present invention is directed to providing a convenient access into the bed of a pick-up truck and, more particularly, a storage compartment having a door closure that can enhance access into the pick-up bed.

BACKGROUND OF THE INVENTION

Given the height of pick-up truck beds, it is often difficult for the user of the pick-up truck to access the cargo bed over the side of the bed. Storage space for smaller, such as personal items, on a pick-up truck is somewhat limited because of the configuration of the cargo bed cannot readily accommodate these small items. Storage compartments on the lateral sides of pick-up trucks are well known in the art to enhance the tool-carrying and small item storage capabilities of pick-up trucks without departing from the cargo-carrying capabilities of the bed. Such storage compartments are found in U.S. Pat. No. 6,030,018, issued to Scott Clare on Feb. 29, 2000, which depicts lateral storage compartments on the side of the pick-up truck both forwardly and rearwardly of the rear axle, with the doors thereof opening horizontally being supported by generally vertical hinge axes.

A storage compartment for a pick-up truck can be found in U. S. Pat. No. 6,129,401, issued to Dorinel Neag, on Oct. 10, 2000, in which the storage compartment is located at the back of the rear quarter panel behind the rear axle of the pick-up truck. The structure of the storage compartment in the Neag patent incorporates a lid that when closed allows the storage bin to be opened without having stored items therein inadvertently fall out. In U.S. Pat. No. 1,726,398, issued to F. C. Limbocker on Aug. 27, 1929, a pivoted lid is provided on the running board to permit access to a tool compartment within the running board. The door of this compartment opens vertically and is horizontally disposed when closed to provide a contiguous top surface of the running board.

In U.S. Pat. No. 5,615,922, issued to Raymond Blanchard on Apr. 1, 1997, a storage compartment is located forwardly of the rear axle and extends into the bed substantially in alignment with the wheel well internally of the cargo bed. This storage compartment includes a vertically opening door that forms a part of the vertical side of the pick-up truck; however, there is no teaching within this reference that the door can be used to access the interior of the cargo bed, other than what is enclosed by the storage compartment through the opening created by the pivoted door.

In U.S. Pat. No. 6,059,341, issued to Thomas Jensen on May 9, 2000, the entire lateral side of the cargo bed portion of the pick-up truck is formed as a single storage compartment door, opening up the cavity between the door, which forms the exterior surface of the cargo bed, and the interior wall of the cargo bed. As with the Blanchard patent, there is no teaching that the vertically movable door can be utilized as a step to enhance access to the interior of the cargo bed. In fact, the overall length of the door member suggests that a substantial weight would not be supported on the door member when opened to gain access into the storage compartment.

A step mounted on the lateral side of a pick-up truck is shown in U.S. Pat. No. 6,533,303, issued to Brad Watson on Mar. 18, 2003, to enhance access into the cargo bed. The step in Watson is pivoted on the lateral side of the cargo bed adjacent the operator's cab of the truck and is movable into extended and retracted positions. While this step is intended to support the weight of a person trying to gain access over the side of the cargo bed, the step does not form a door on a storage compartment and there is no teaching or suggestion within the patent that the step is associated in any manner with a storage compartment. In U.S. Patent Application Publication No. US 2001/0024023, a step is attached to the vehicle chassis above a drawer; however, like the Watson patent, the step does not form a door for a storage compartment and is not otherwise associated with the storage compartment.

Accordingly, it would be desirable to provide a storage compartment on the lateral side of a pick-up truck where the hinges for the vertically opening door would be concealed when the door is closed, and where the door would be formed in a manner that would support the normal weight of a person so as to facilitate the access of the cargo bed over the side thereof when the door to the storage compartment is opened into a horizontally extending position.

SUMMARY OF THE INVENTION

It is an object of this invention to overcome the aforementioned disadvantages of the prior art by providing a storage compartment for the lateral side of a pick-up truck where the opened door can be used to support the weight of the user and facilitate access into the cargo bed.

It is another object of this invention to provide a combination storage compartment and access step for a pick-up truck.

It is a feature of this invention that the door to the storage compartment opens to a generally horizontal position to provide use thereof as a step for the user to gain access to the interior of the cargo bed of the pick-up truck.

It is an advantage of this invention that the door forms a continuous surface of the side panel of the pick-up truck when moved to a generally vertical closed position.

It is another feature of this invention that the storage compartment door is supported by a pivot mechanism that is concealed when the door is moved to the generally vertical closed position.

It is another advantage of this invention that the storage compartment door is configured to support the weight of a human being to facilitate the user thereof in accessing the cargo bed over the side portion thereof.

It is still another feature of this invention that the storage compartment door is provided with supplemental support members that limit the movement of the door to a horizontal position when being used as a step.

It is still another advantage of this invention that the supplemental support members are connected to rigid reinforcement supports on the pick-up truck.

It is yet another object of this invention to provide a storage compartment with a door that can be utilized as a step to gain access to the interior of the cargo bed of a pick-up truck, which is durable in construction, inexpensive of manufacture, carefree of maintenance, facile in assemblage, and simple and effective in use.

These and other objects, features and advantages are accomplished according to the instant invention by providing a storage compartment on the lateral side of a pick-up truck having a door that will open to a generally horizontal position to permit use thereof as a step to facilitate access to the interior of the cargo bed. The storage compartment door is pivotally supported by a pivot mechanism that is mounted to rigid reinforcements on the pick-up truck to provide sufficient support thereof to withstand the weight of a person utilizing the door as a step. The door is also provided with supplemental support members interconnecting the door and underside of the pick-up box. When closed, the door conceals the pivot mechanism to provide a smooth, clean line on the exterior surface of the truck. The opened door allows access to a storage compartment that preferably extends beneath a portion of the cargo bed to allow storage of small items in a contained compartment.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a cross-sectional view corresponding to lines 3—3 of FIG. 2 through the supplemental support member to show an elevational view of the storage compartment and opened door capable of being used as a step to facilitate access into the cargo bed;

FIG. 4 is a cross-sectional view of the pick-up truck similar to that of FIG. 3 but depicting the structural support for the pivot mechanism of the storage compartment door;

FIG. 5 is a perspective view of the storage compartment depicting an alternative configuration for the supplemental support members;

FIG. 6 is a perspective view similar to that of FIG. 5 but showing still other alternative supplemental support members for the opened storage compartment door, the support strap on one side of the door being of a different form than the strap on the opposing side of the door to depict alternative configurations of the straps; and FIG. 7 is an elevational view of one of the strap configurations shown in FIG. 6 utilizing a bayonet joint to provide positional control over the opened storage compartment door.

DETAILED DESCRIPTION OF THE PREFERRED EMBODIMENT

Figure 1:
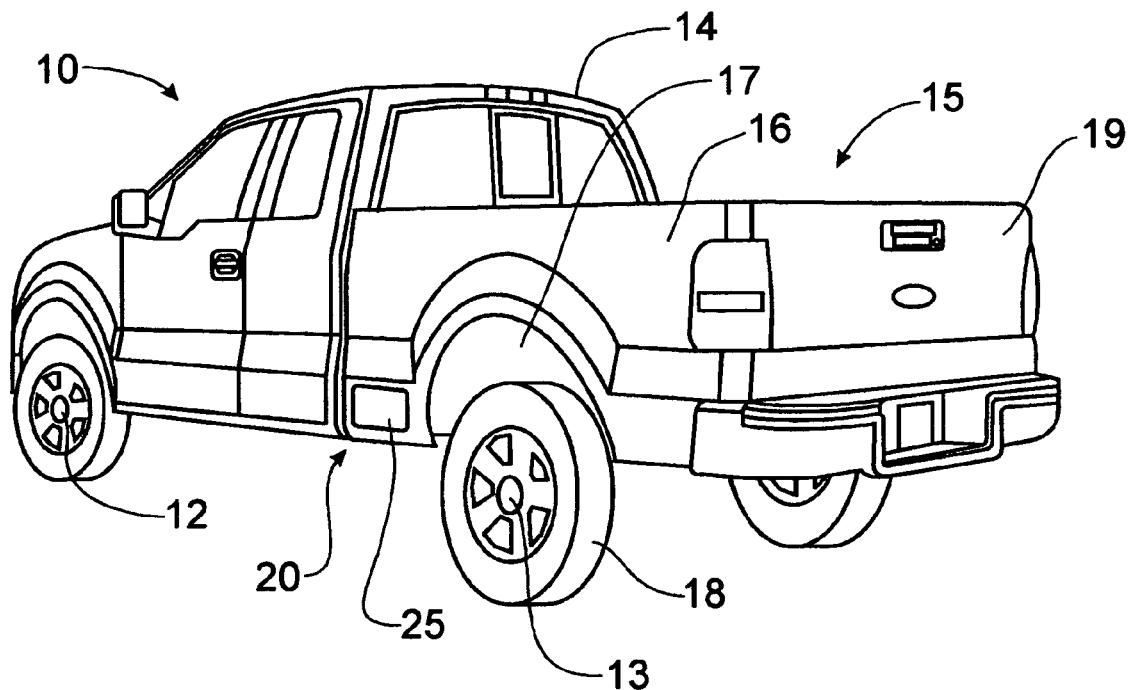
FIG. 1 is a perspective view of a pick-up truck having a laterally positioned storage compartment incorporating the principles of the instant invention, the door to the storage compartment being moved to the generally vertical closed position.

Referring to FIGS. 1–4, a storage compartment incorporating the principles of the instant invention for the lateral side of a pick-up truck can best be seen. The pick-up truck 10 includes a frame 11 supported above the surface of the ground by a forward wheeled axle 12 and a rearward wheeled axle 13. An operator's cab 14 is forwardly located between the front and rear axles 12, 13 and contains conventional operative controls (not shown) for operating the pick-up truck 10. The pick-up truck 10 also includes a cargo bed or pick up box 15 located behind the operator's cab 14 and above the rear axle 13. The cargo bed 15 typically has an open top, which may be equipped with a cover (not shown) to restrict access into the cargo bed, lateral sides 16 which define a wheel well 17 surrounding the wheels 18 on the rear axle 13. The rear of the cargo bed 15 typically incorporates an access door, commonly referred to as a tail gate, which is movable from the vertical position depicted in FIGS. 1 and 2 to a conventional generally horizontal position to permit access into the cargo bed 15.

The lateral sides 16 of a standard sized pick-up truck 10 are often sufficiently high, particularly with four-wheel drive versions, as to make accessing the cargo bed 15 from the side of the pick-up truck 10, when the user is standing on the surface of the ground, difficult. In some circumstances, particularly where the user wants to access a portion of the cargo that is located at the forward end of the pick up box 15 adjacent the operator's cab 14, the user will either have to access the pick up box 15 through the tail gate 19 or climb awkwardly on the lateral side 16 of the pick-up truck 10 to access that portion of the cargo. Such activity can damage the finish on the lateral side 16 of the truck 10 or otherwise inflict damage to the lateral side 16.

In some cases, such as is represented by U.S. Pat. No. 6,533,303, issued to Brad Watson on Mar. 18, 2003, a step is added to or built into the lateral side of the truck 10 to support the weight of an individual while accessing the interior of the cargo bed 15 of the pick-up truck 10. As is recognized in U.S. Pat. No. 6,059,341, issued to Thomas Jensen on May 9, 2000, pick-up trucks 10 have a need for additional storage capabilities for small items, such as tools, without utilizing or sacrificing the volume of the cargo bed 15 of the truck 10 or the internal volume of the operator's cab 14. When storage compartments, such as are described in the Jensen patent, are located on the exterior of the pick-up truck 10, a convenience factor can be obtained as the user of the truck 10 would have the tools or other appropriate small items readily accessible when outside the operator's cab 14.

Accordingly, a storage compartment 20 incorporating the principles of the instant invention is depicted in FIGS. 1–4. The storage compartment 20 is formed with an outwardly oriented access opening 22 through which access to the interior of the storage compartment 20 can be gained. Preferably, the storage compartment 20 is a sealed compartment supported by the underside of the pick up box 15, as is depicted in FIGS. 3 and 4. The opening 22 is covered by a door 25 that is pivotally supported on the frame 11 of the truck 10 by a pivot mechanism 27, instead of a pair of simple hinges as are taught within the prior art.

To adequately support the pivot mechanism 27 in order to withstand the weight of a user without suffering damage to the pivot mechanism 27, a reinforcement 21 is added to the lateral side 16 of the pick-up truck 10 adjacent to the access opening 22. The reinforcement 21 is then connected to a further reinforcement 21a affixed to the underside of the pick up box 15 by structural support brackets 28, as is best seen in FIG. 4. Thus, the pick up box supported pivot mechanism 27 is provided with adequate strength to withstand the weight of a human being without being damaged. Preferably, the pivot mechanism 27 is built into the door 25 so that when the door 25 is moved to the closed position, shown in FIG. 1, the pivot mechanism 27 is hidden from view. Preferably, the pivot mechanism 27 is built into the door 25 so that when the door 25 is moved to the closed position, shown in FIG. 1, the pivot mechanism 27 is hidden from view.

Figure 2:
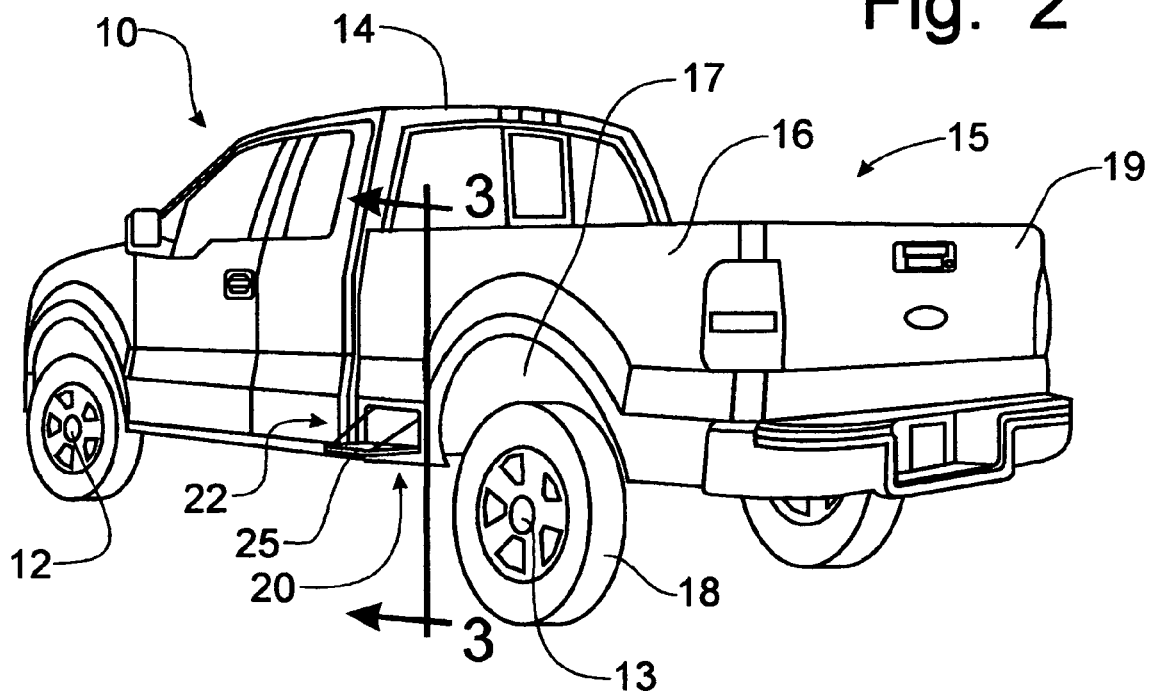
FIG. 2 is a perspective view of the pick-up truck as shown in FIG. 1, but having the door to the storage compartment being opened to the horizontal position in which the door can be utilized as a step to gain access into the interior of the cargo bed.

To provide supplemental support to the door 25 and to limit the movement of the door 25 to a generally horizontally extended position, as is depicted in FIGS. 2–4, the door 25 is provided with supplemental support members 30 that interconnect the door 25 and the underside of the pick up box 15. In FIGS. 3 and 4, the form of the supplemental support members 30 is a pair of cables 32 positioned on opposing fore-and-aft sides of the door 25. The cables 32 are sized to become taut when the door 25 reaches the horizontal position. Cables 32 have the additional advantage of being flexible when the door 25 is closed so that spatial accommodations for the cables 32 are minimal. Furthermore, cables 32 have the advantage of being easily disconnected from the door 25 to permit the door 25 to be moved conveniently below the horizontal position in which the door 25 can be used as a step, as will be described in greater detail below.

Alternatively, as can be seen best in FIG. 5, the supplemental support members 30 can take the form of an arcuate strap or plate 34 having an arcuate slot 35 formed therein with the center of curvature thereof coinciding with the pivot mechanism 27. Such structural straps 34 could be supported from the underside of the pick up box of the truck 10 or from the reinforcement 21 to provide adequate support for use of the door 25 as a step. While disconnection of the structural straps 34 would be somewhat more cumbersome than the cables 32 described above, such structural straps 34 could also be disconnected from either the support structure 21, 15 or the door 25 to permit the door 25 to open below the horizontal position.

Referring now to FIGS. 6 and 7, alternative structural straps 36, 38 can best be seen. These structural straps 36, 38 are also arranged to support the weight placed on the door 25 from the pick up box 15 of the truck 10, or alternatively from the reinforcement 21, but are generally linear in configuration. The linear configuration enables the structural straps 36, 38 to project linearly inwardly from the door 25 when moved to the closed position, as opposed to the vertical pivotal movement of the arcuate structural straps 34 described above. To provide a positive engagement between the strap 38 and the structural support 21 thereof, the structural strap 38 is provided with a bayonet slot 39, best depicted in FIG. 7, in which the frame-mounted stop 29 can be positioned to limit movement of the door 25 when in the open horizontal position, thus enhancing the use of the door 25 as a step.

In operation, the user simply opens the door 25 via a conventional latch (not shown) to move the door from to generally vertical position depicted in FIG. 1 to the open generally horizontal position depicted in FIG. 2. Once opened, the user has free access into the storage compartment 20. Since the door 25 is adequately supported by the pivot mechanism 27 and the supplemental support members 30 to withstand the weight of an individual standing on the door 25, the door 25 can be utilized as a step to permit the user to gain vertical height for accessing the interior of the cargo bed 25 immediately rearwardly of the operator's cab 14. If the door 25 hinders access into the storage compartment 20, the supplemental support members 30 can be disconnected to allow the door 25 to drop below the horizontal position in which the door 25 can be used as a step.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, the following is claimed:

1. A storage compartment for a pick-up truck having a pick up box supported on a frame of the pick-up truck, comprising:
   an enclosed compartment supported by said pick up box and defining an access opening on a lateral side of said pick-up truck, said enclosed compartment being separate from and located below said pick-up box;
   a door pivotally movable between a generally vertical closed position that covers said access opening and a generally horizontally oriented open position;
   a pivot mechanism connected to said door to permit pivotal movement thereof; and
   support members interconnecting said pick up box and said door to permit said door to withstand sufficient weight to permit said door to be used as a step in gaining access to said pick-up box, said pivot mechanism being supported from said pick up box by support brackets to permit said pivot mechanism to withstand said weight.

2. The storage compartment of claim 1 wherein said pivot mechanism is mounted in said door such that said pivot mechanism is concealed from external view when said door is in said generally vertical closed position.

3. A storage compartment for a pick-up truck having a pick up box supported on a frame of the pick-up truck, comprising:
   an enclosed compartment supported by said pick up box and defining an access opening on a lateral side of said pick-up truck, said enclosed compartment being separate from and located below said pick-up box;
   a door pivotally movable between a generally vertical closed position that covers said access opening and a generally horizontally oriented open position;

a pivot mechanism connected to said door to permit pivotal movement thereof; and slotted straps interconnecting said pick up box and fore-and-aft sides of said door to permit said door to withstand sufficient weight to permit said door to be used as a step in gaining access to said pick-up box, said slotted straps being configured to stop said door at said horizontal open position.

4. The storage compartment of claim 3 wherein said slotted straps are arcuate in shape and have a center of curvature corresponding with said pivot mechanism.

5. The storage compartment of claim 3 wherein said slotted straps have a linear shape.

6. The storage compartment of claim 5 wherein said linear slotted straps are formed with a bayonet slot.

7. In a pick-up truck having a chassis frame supported for movement over the ground by a front wheeled axle and a rear wheeled axle; an operator's cab supported on said chassis frame forwardly of said rear axle; and a pick up box supported on said chassis frame behind said operator's cab over said rear axle, said pick up box having lateral sides and a floor, the improvement comprising:

a storage compartment formed in at least one of said lateral sides and defining an access opening formed in said at least one lateral side;

a door pivotally supported by a pivot mechanism for movement between a generally vertical closed position and a generally horizontal open position, said door being configured to serve as a step for access to said pick up box over said at least one lateral side; and support members interconnecting said door and reinforcement members affixed to said pick up box to permit said door to withstand sufficient weight to permit said door to be used as a step in gaining access to said pick-up box, said support members being configured to stop said door at said horizontal open position.

8. The pick-up truck of claim 7 wherein said pivot mechanism in supported from said pick up box by support brackets interconnecting said pivot mechanism and said pick up box.

9. The pick-up truck of claim 8 wherein said pivot mechanism is mounted in said door such that said pivot mechanism is concealed from external view when said door is in said generally vertical closed position.

10. The pick-up truck of claim 7 wherein said support members comprise cables interconnecting fore-and-aft sides of said door with said pick up box, said cables being sized to become taut when said door reaches said horizontal open position.

11. The pick-up truck of claim 7 wherein said support members are slotted straps connected to fore-and-aft sides of said door, said slotted straps being configured to stop said door at said horizontal open position.

12. In a pick-up truck having a chassis frame; and a pick up box formed with transversely opposing lateral sides, at least one of said lateral sides having formed therein a storage compartment having a door movable between a generally vertical closed position and a generally horizontal open position, the improvement comprising:

said door being configured to support a weight sufficient to permit the use of said door as a step to gain access into said pick up box over said at least one lateral side, said door being supported by a reinforced pivot mechanism and by slotted straps interconnecting respective fore-and-aft sides of said door and said pick up box, said slotted straps being sized to stop the pivotal movement of said door at said horizontal open position.

13. The pick-up truck of claim 12 wherein said pivot mechanism is supported in said door so as to be concealed from external view when said door is in said vertical closed position.

* * * * *